July 12, 1966 G. JAVAUX 3,260,585
PROCESS AND APPARATUS FOR MANUFACTURING
A FIRE-POLISHED GLASS STRIP
Filed Aug. 7, 1962 3 Sheets-Sheet 1
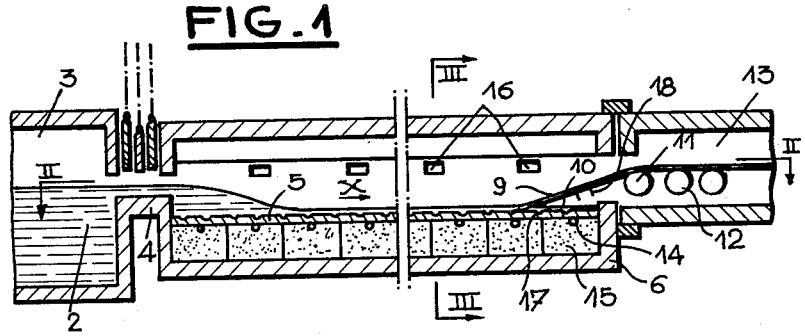
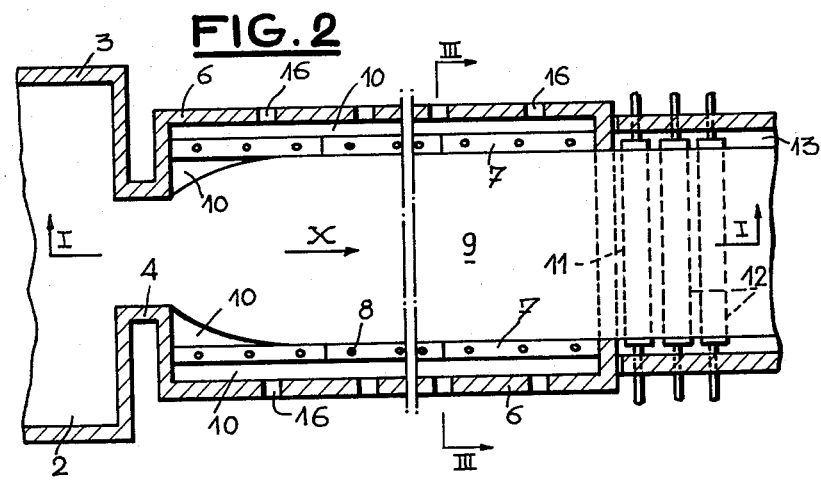
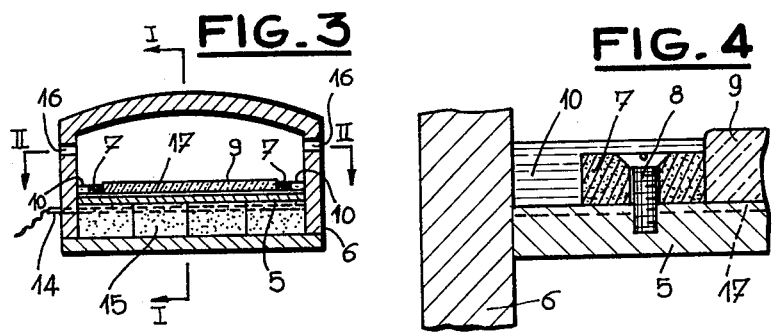

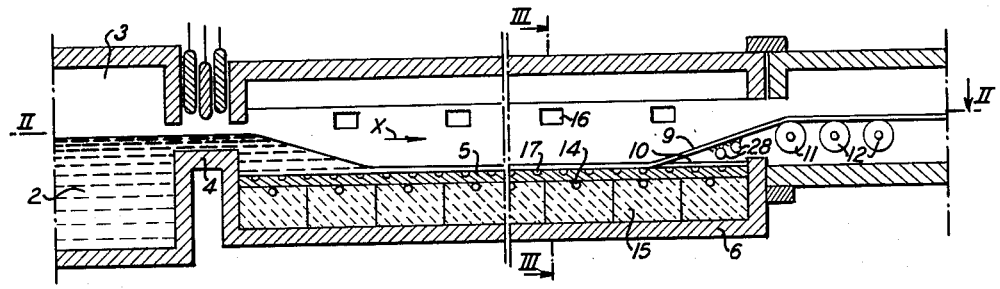

United States Patent Office 3,260,585
Patented July 12, 1966

3,260,585
PROCESS AND APPARATUS FOR MANUFACTURING A FIRE-POLISHED GLASS STRIP
Gustave Javaux, Saint-Gilles, Belgium, assignor to Glaverbel, Brussels, Belgium
Filed Aug. 7, 1962, Ser. No. 215,310
Claims priority, application Luxembourg, Aug. 10, 1961, 40,496
9 Claims. (Cl. 65—65)

This invention relates to a process for the manufacture of fire-polished glass strip wherein the shaped strip slides continuously in contact with a molten substance, the temperature of which decreases sufficiently in the direction of strip feed for the same not to be damaged by contact with conveying elements after removal from the molten substance, the same being unaffected by air at the working temperatures.

It is known for a glass strip which has just been formed to be fire-polished by floating on a metal bath heavier than the glass, the strip being slid over the bath by being pulled by conveying rollers acting on the strip part which has been lifted out of the bath at a place where the strip is rigid enough for its surface not to be damaged by contact with the rollers. It is also known for the glass strip to be completely immersed in a metal bath of the kind just specified before being lifted out of the bath by being pulled by conveying rollers, the strip surface not being damaged between such rollers.

In the latter variant, the strip must, before entering the metal bath, be made sufficiently rigid for it to be forced to enter the bath inclinedly, and the bath must be maintained at a temperature high enough to ensure that, in the light of the time taken by the strip to pass through the bath, the strip can be bent upwards and pulled out of the bath by the conveying rollers.

In both these variants, the metal or alloy is completely molten and oxidizable in air at the working temperatures, and a non-oxidizing atmosphere must be maintained above the metal bath to prevent oxidation thereof.

It is also known to mould a strip of a fusible substance, more particularly glass, by introducing the sufficiently hot raw material between two layers of molten substances, one of which is denser, and the other of which is less dense, than the substance for moulding, for instance, glass. The substances used for the molten layers must be unaffected by air and inert to the substance being moulded and to one another. Also, the melting point of such substances must be below the melting point of the substance being moulded, the same moving toward an exit aperture from the mould while being cooled sufficiently to be drawn out of the mould through such aperture by a pair of rollers disposed outside the mould. The speed at which the rollers rotate must allow for the rate at which the substance is forceably introduced between the two layers of moulding liquid, to ensure that the thickness of the layer of moulded substance reaching the exit aperture is always slightly greater than the size thereof, otherwise the moulding liquids will leak out of the mould. This process has never proved satisfactory in practice with glass, for quite apart from the difficulties in avoiding liquid leakages, the glass surface is damaged considerably when the sheet or strip passes through the slot and also by the pressure applied by the drawing rollers, so that it would be impossible for a glass strip to have the appearance associated with fire-polishing. Also, the glass would have to be given its final shape by being passed through a drawplate.

According to another suggestion, a glass strip is drawn vertically through a molten mass of lower density than glass, such substance being clamped around the drawing bulb to prevent the same from being directly affected by convection currents along the vertical strip being drawn. If the molten substance is formed by an oxidizable metal of lower density than glass, such metal can be protected against oxidation by a metal compound having a lower density and melting point than the density and melting point of the metal. In this process the fire-polishing is, of course, performed before the glass passes through the molten substance, because of the way in which the glass sheet is formed by pulling and drawing. There are, however, disadvantages inherent in this process, such as lack of flatness, and an output much less, for instance, than can be provided by rolling.

It is also known for the flow of glass from a refining area to pass over a layer of molten metal denser than the glass towards the place where it is collected, in order to form a glass strip by rolling. The metal layer is completely molten and renders the temperature of the glass uniform throughout the glass before the glass sheet rollers, so that the strip or sheet remains with the defects produced by rolling.

In the process according to the invention, the glass strip slides simultaneously in contact with a solid flat metal baseplate and with a film of molten substance which wets the glass and which is unaffected by air at the working temperatures.

The flat and solid metal base which the glass strip contacts is a much better heat conductor than a liquid metal or a thick layer of a metal salt denser than glass, so that even where such a layer is contained in a metal vessel, it is impossible with the known processes to render the temperature of the glass strip uniform throughout, thus leading to a strip of very uniform thickness, in the way which the process according to the invention makes possible. Because of the thinness of the film of lubricating molten substance which is carried along between the glass strip and the flat and solid metal base, the heat transfer between such base and the glass strip is only slightly reduced. Also, it is much easier to replace heating elements which serve to vary the temperature of the base in the direction of glass strip movement when such elements are received in recesses below the solid metal base than when such elements are immersed in a molten bath.

Preferably, the intermediate molten substance which is carried along between the glass strip and the metal, flat and solid base is formed by a metal salt which wets the glass more than a molten metal could do. However, the invention does not exclude the use of molten metal provided that it is covered with a layer of molten substance unaffected by atmospheric air at the working temperatures.

The use of a salt of this kind prevents oxidation of the metal solid base, if the same is oxidizable, whether the salt covers the base directly or whether the salt covers a molten metal acting as an intermediate wetting layer and disposed between the flat solid base and the glass strip sliding thereover.

As advantageous intermediate molten substances there may be mentioned the halogenated salts of alkaline or alkaline-earth metals or mixtures of such salts. Mixing the salts helps to vary the density of the intermediate molten substances. When the mixtures are eutectic mixtures, the melting point is lowered. It is preferred to use salts which have a low vapor pressure at 1000° C., and barium and calcium chlorides are very suitable in this respect because their vapor pressure is substantially negligible. They protect the metal below them from oxidation if such metal is likely to be oxidized in air at the working temperatures, as are copper and its alloys.

The invention has also for object an apparatus for performing the process according to the invention and comprising a vessel for a molten bath, the glass strip sliding in contact with the molten bath before being removed therefrom at a place where the temperature is low enough for a mechanical conveyor which the strip subsequently contacts not to damage the surface of the glass, wherein the thickness of the layer of molten substance is such that, in the light of the density of such substance, it allows the glass strip to slide in contact with the flat and solid metal base of the vessel. Preferably, that part of the flat and solid metal base with which the glass strip engages is in one piece. Advantageously, the base is applied with molten substance at various places reached consecutively by the moving strip, and to this end is formed with transverse grooves which extend from beyond the strip side edges to the strip center and which are with advantage longer than the width of the strip. Preferably, that part of the flat, solid base with which the glass strip engages is made of metals which are good heat conductors, such as silver or copper or gold, in order to increase the rate at which the temperature becomes uniform across strip width and to ensure that the thicknesses of the glass strip are absolutely regular. Taking the heat conductivity of silver as unity, then the heat conductivity of copper is 0.94, of gold 0.71, of tin only 0.152 and of lead 0.082.

In another embodiment, which helps to reduce and even to obviate the pull applied to the fire-polished part of the glass strip in order that such part may slide in contact with the flat and solid metal base, the same is so inclined that the place where the strip leaves such base is lower than the place where the strip contacts such base, while the molten substance contained in the vessel is lighter than the glass. The glass strip is therefore helped to slide over the inclined base by gravity.

Preferably, the vessel is so mounted that the inclination of the vessel base can be adjusted. The inclination can therefore be adjusted to suit the thickness of the glass strip and the difference between the density of the glass being treated and the density of the molten substance in which the glass is immersed.

According to another feature of the apparatus according to the invention, carbon straight edges parallel with the longitudinal axis of the glass strip are rigidly secured to the base of the vessel at a spacing from one another such that the edges of the glass strip slide in contact with such straight edges.

Other features and details of the invention will become apparent from the description of the accompanying drawings which diagrammatically illustrate, solely by way of example, two embodiments of the apparatus according to the invention and in which:

FIG. 1 is a longitudinal section, taken along the line I—I of FIGS. 2 and 3, of a first embodiment of the apparatus according to the invention;

FIG. 2 is a plan view horizontally sectioned along the line II—II of FIGS. 1 and 3;

FIG. 3 is a cross-section taken along the line III—III of FIGS. 1 and 2;

FIG. 4 is a view to an enlarged scale of a part of FIG. 3;

FIG. 7 is a longitudinal section similar to FIG. 1 showing another embodiment for removing molten substance from the glass ribbon; and FIG. 8 is a longitudinal section similar to FIG. 5 showing another embodiment for removing molten substance from the glass ribbon.

Like elements are indicated by like references throughout the drawings.

Figure 5:
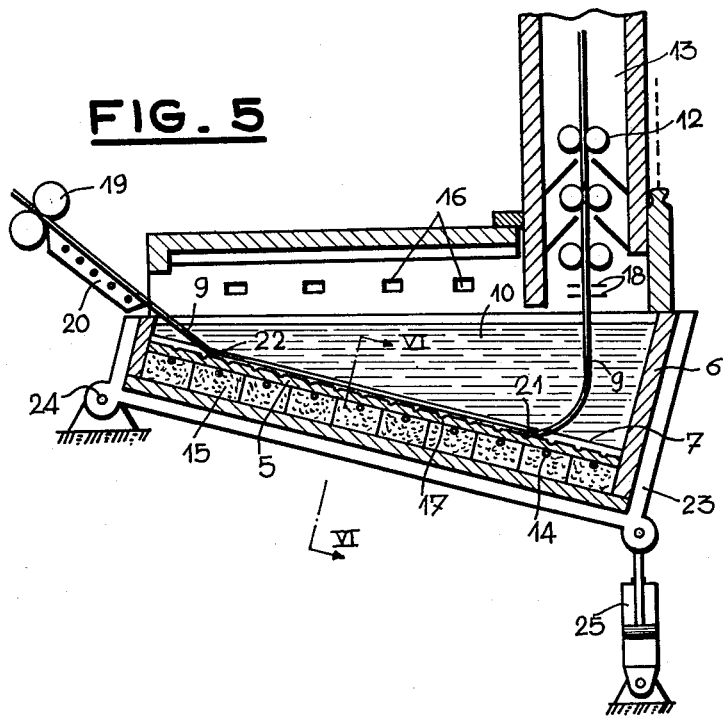
FIG. 5 is a longitudinal section, similar to what is shown in FIG. 1, through a second embodiment.

Referring to FIGS. 1 and 2, glass 2 in a refining vessel 3 overflows therefrom over a threshold 4 and spreads over a flat, solid metal member 5 forming the base of a vessel or tank 6. The overflowing glass thins out rapidly as it moves, in the direction indicated by arrow X, parallel with the longitudinal axis of the tank 6 and it spreads out in width until abutting carbon straight edges 7 which are parallel with the longitudinal axis of the tank 6 and which are placed at a distance from the side walls thereof. The straight edges 7 are secured to base 5 by means of screws 8, as can be seen in FIG. 4. That part of tank 6 which is near the vessel 3 is therefore the equivalent of a device for shaping a glass strip 9 which slides along in contact with the carbon straight edges 7 and the solid metal base 5.

Tank 6 contains a molten bath 10 of a substance unaffected by air at the working temperatures. Preferably, the molten substance is formed by a eutectic mixture.

Near the overflow threshold, the temperature of base is maintained near the pouring temperature of the glass, but gradually decreases towards the opposite end of the base 5 where it is maintained at about 600° C.; this ensures that the glass strip leaving the base is cool enough for its surface not to be damaged when it contacts a bending roller 11 and conveying rollers 12 disposed in an annealing tunnel 13. Controlling the variation of the temperature of the base 5 in the direction of strip movement is facilitated by the presence of electric heating resistances 14 which are received below the base 5 in recesses in refractory insulating blocks 15. The side walls are formed with apertures 16 adapted to receive burners for helping to maintain an appropriate temperature in the enclosed space above the glass strip. The burners can also be used to melt—in tank 6 and before treatment of the glass strip— the metal or alloy which will subsequently form the base 5, so that a solid flat metal surface is provided once the last-mentioned metal or alloy has solidified.

Instead of using a mixture of barium chloride and calcium chloride to form the molten substance 10, other halogenated salts of an alkaline or alkaline-earth metal can be used alone or in mixture, for instance, sodium, potassium, lithium, calcium and barium chlorides, bromides and iodides, which have the property of wetting the glass very satisfactorily and of being unaffected by air at the working temperatures.

The following eutectic mixtures of salts of this kind, and their melting points, are worth mentioning:

|  | ° C. |
|---|---|
| $NaCl+MgCl_2$ | 450 |
| $LiCl+CaCl_2$ | 495 |
| $LiCl+BaCl_2$ | 510 |
| $KCl+CaCl_2$ | 595 |
| $KCl+BaCl_2$ | 650 |
| $CrCl_2+KCl$ | 585 |
| $KCl+CaCl_2+BaCl_2$ | 550 |

Other alkaline or alkaline-earth salts can also be used, such as borates alone or mixed with one another or with halogenated alkaline or alkaline-earth salts.

If the molten substance used is of a lower density than the glass, the strip 9 rests naturally on the solid metal base 5 by its own weight. However, a substance having a density equal to or above the density of the glass may be used for the molten substance provided that the level of such molten substance is far enough below the top surface of the glass strip for the buoyancy of the bath to be less than the weight of that part of the glass strip which rests on the base 5. Advantageously, whatever the density of the molten substance unaffected by air may be, such substance covers the carbon straight edges 7 in the manner shown in FIG. 4, thus obviating the need to maintain a non-oxidizing atmosphere in the tank 6 to prevent oxidation of the carbon.

The movement of the glass strip over the flat solid base 5 is facilitated by the glass-wetting film of molten substance. When the strip is in contact with the flat solid metal base 5, which is a better heat conductor than a bath of molten metal or salts, temperatures and thicknesses even out rapidly across the width of the strip.

Another feature visible in FIGS. 1, 3 and 4 is that the solid metal base 5 is formed with transverse grooves 17 which extend not only over the whole width of the glass strip 9 and of the carbon straight edges 7 but also as far as the gaps between the straight edges 7 and the tank side walls. The molten substance 10 can therefore be permanently maintained in contact with the glass strip at different places along the path followed thereby in contact with the base 5. The transverse grooves 17 are shown as extending in a direction perpendicular to the direction of strip movement but can, if required, extend inclinedly to the direction of strip movement. Also, the grooves 17 need not each extend over the whole width of the strip 9, and those extending to one side or the other thereof can stop before reaching the opposite edge, for instance, in the center of the strip.

As an alternative form of embodying a flat solid metal base formed with grooving for supplying a wetting substance to the center of the strip, the base can be formed by means of non-contiguous metal battens or of juxtaposed round rods extending beyond the carbon straight edges 7 along which the strip 9 slides.

Also visible in FIG. 1 are scrapers 18 made of glass fibres having a higher melting point than the glass of the strip 9; the scrapers 18 scrape off, from the strip surface previously in contact with the bath 10, any molten substance which has remained stuck to such surface. Instead of scrapers, blowers 28 can be used which blow air onto the strip, at a temperature similar to the temperature of the glass, at the blowing station in order not to chill the glass.

FIG. 5 illustrates another embodiment according to the invention wherein the glass strip 9 formed at the exit from a rolling mill 19 slides on an inclined cooled metal table 20 at the end of which the glass dips into a bath 10 of a molten substance which is lighter than the glass. The substance 10 is received in a tank 6 having an inclined base 5. The inclination of the base 5 is such that the place 21 where the strip 9 leaves the base 5 is lower than the place 22 where the strip 9 first contacts the base 5. Consequently, if the base 5 is sufficiently inclined the strip 9 can slide therealong without any pull having to be applied to the strip at the place 21. The inclination to the horizontal must not be excessive, for the lubricating action of the film of molten subtance ensures a low coefficient of friction between the glass strip 9 and the base 5.

During its rolling and its passage over the cooled table 20, the glass strip 9 solidifies superficially, but when it dips into the bath 10 and rests on the metal base 5, the glass strip 9 heats up rapidly and experiences uniformity of temperature across its width, uniformity of its thickness, and fire-polishing. As the strip proceeds along base 5 it experiences a continuous reduction of its temperature, which stays uniform widthwise of the strip, down to a final temperature such that the glass strip is sufficiently solidified and viscous to withstand without damage the pull of the pairs of rollers 12 in the annealing tunnel 13.

The weight of the glass strip to be lifted off the base 5 by the pairs of rollers 12 comprises the weight of the strip part which has left the bath plus the weight of that part of the strip above the place 21 which is still immersed in the bath, and is equal to the volume of the latter part multiplied by the difference between the density of the glass and the density of the molten substance 10. In this embodiment, the force applied to the glass by the conveying rollers cannot be reduced by making the bath density equal to or greater than the density of the glass, for the glass strip would not then slide along the inclined base 5 by gravity.

The tank 6 is supported by a frame 23 which is articulated to a pivot 24 at its end near the place where the strip enters the tank 6 and which is articulated to at least one jack 25 at its opposite end. Consequently, the last-mentioned end can be raised or lowered to give the base 5 the inclination best suited to the difference between the density of the treated glass and the density of the molten substance in arranging for the force required to slide the strip 9 over the base 5. If the inclination of the tank can be adjusted, the metal which will subsequently form the base 5 can be cast in situ while the base of the tank is horizontal. After the metal has solidified and the carbon straight edges 7 have been secured, the tank 6 is inclined and filled with a substance which will subsequently form the bath 10.

Figure 6:
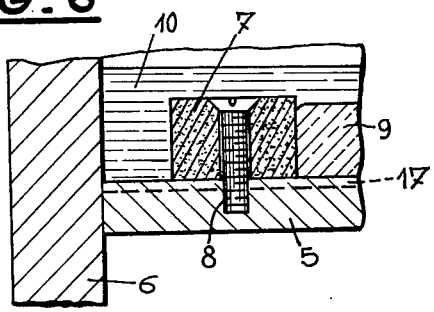
FIG. 6 is a view to an enlarged scale of a detail of a cross-section taken along the line VI—VI of FIG. 5.

As is apparent more particularly in FIG. 6, the molten bath 10 completely covers not only the carbon straight edges 7 but also the glass strip 9. The scrapers 18, previously referred to in connection with the apparatus shown in FIGS. 1–4 must then be placed opposite the two surfaces of the strip as shown in FIG. 7 to remove therefrom the material of the bath 10 which sticks to the strip after the same leaves the bath. When hot air blowers 28 are used for removing the molten substance from the strip issuing from the molten bath 10 of FIG. 5, these air blowers must also be placed opposite the two surfaces of the strip as shown in FIG. 8.

Of course, the invention is not limited just to the embodiments illustrated, and many modifications can be made to the form, arrangement and constitution of some of the elements used to embody the invention without departing from the scope thereof, provided that such modifications do not conflict with the subject matter of each of the following claims.

What I claim is:

1. A process for manufacturing a continuous fire-polished glass strip comprising forming a continuous sheet of glass, sliding the sheet continuously in a longitudinal direction onto a fixed, metallic, smooth, flat and solid base plate which supports the sheet, regulating by heat exchange the temperature of the surfaces of the sheet in a range in which the surfaces will be fire-polished, diminishing the temperature of said sheet as it advances along the base plate, lifting the sheet from the base plate to remove the same therefrom by engaging the sheet in a zone thereof sufficiently cooled such that the sheet is removed from the plate with the surfaces of the sheet unmarked, interposing between said plate and said glass sheet a molten film of a metal salt selected from the group consisting of halogenated salts of alkaline and alkaline earth metals and mixtures thereof, which salt has a low coefficient of friction and wets the sheet to facilitate sliding thereof on the base plate, said metal salt being inert in air at the temperatures of the sheet and covering the base plate to protect the same from contact with air.

2. Apparatus for manufacturing a continuous fire-polished glass strip comprising means for supplying a continuous glass strip, a tank receiving the glass strip, said tank including a fixed, metallic, smooth, flat and solid base plate, conveying means conveying the continuous glass strip longitudinally along said base plate, molten metal salt means between said glass strip and said base plate forming a flowable film between the strip and said base plate to wet the glass strip and facilitate sliding of the glass strip on the base plate, said molten metal salt means being inert with respect to air and covering said metal base whereby atmospheric air may be present in the tank and be non-reactive with said base, heating means in said tank for heating the strip at the entry thereof in said tank to a temperature at which the strip becomes fire-polished, the heating means gradually diminishing the temperature of the strip as it advances in said tank, said conveying means being positioned at a level above said base plate and at a longitudinal position at which the strip is at a sufficiently low temperature whereby the strip can be engaged by the conveying means and lifted from said tank without further contact with said tank and without affecting the fire-polish of the strip, said metal base having a relatively high coefficient of thermal conductivity to promote heat exchange with the glass strip and thereby render the strip with uniform temperature along its width.

3. The apparatus as claimed in claim 2, wherein said tank contains a bath of molten substance which is less dense than the glass strip, the strip being submerged in the bath, the base of said tank being inclined with the horizontal such that said glass strip leaves said base at a location lower than the location whereat the strip initially comes into contact with said base, the glass strip coming into contact with said base at a level lower than the upper level of said molten substance.

4. The process as claimed in claim 1, wherein a eutectic mixture of salts is used as the molten salt substance.

5. The apparatus as claimed in claim 2, wherein transverse grooves extend in the upper part of said base plate from beyond the lateral edges of the glass strip to the centre of said strip.

6. The apparatus as claimed in claim 2, wherein said grooves are longer than the width of said glass strip.

7. The apparatus as claimed in claim 2, comprising adjusting means for the inclination of said base plate.

8. The apparatus as claimed in claim 7, comprising a pivot at that end of said base plate which is near the place where the glass strip comes into contact with said base plate and at least one articulated jack at the other end of said base plate.

9. The apparatus as claimed in claim 2, comprising blowers blowing heated air on said strip where same has left the molten salt substance for removing any molten substance sticking to said strip.

References Cited by the Examiner

UNITED STATES PATENTS

| | | | |
|---|---|---|---|
| 1,199,108 | 9/1916 | Pieler | 65—25 |
| 1,207,867 | 12/1916 | Cordes | 65—258 |
| 1,564,240 | 12/1925 | Hitchcock | 65—82 |
| 1,904,978 | 4/1933 | Cone | 65—258 |
| 2,188,608 | 1/1940 | Littleton et al. | 65—169 |
| 2,754,559 | 7/1956 | Fromson. | |
| 2,968,893 | 1/1961 | Pilkington | 65—182 |
| 3,083,551 | 4/1963 | Pilkington | 65—182 |

DONALL H. SYLVESTER, *Primary Examiner.*

D. CRUPAIN, *Assistant Examiner.*